United States Patent [19]

Strominger et al.

[11] Patent Number: 5,284,634
[45] Date of Patent: Feb. 8, 1994

[54] PURIFICATION OF BAYER PROCESS LIQUORS USING CATIONIC POLYMERIC QUATERNARY AMMONIUM SALTS

[75] Inventors: Michael G. Strominger, Dekalb; John T. Malito, Oswego, both of Ill.

[73] Assignee: Nalco Chemical Company, Naperville, Ill.

[21] Appl. No.: 4,354

[22] Filed: Jan. 14, 1993

[51] Int. Cl.$^5$ .............................................. B01D 21/01
[52] U.S. Cl. ................................................... 423/130
[58] Field of Search ........................................ 423/130

[56] References Cited

U.S. PATENT DOCUMENTS 5,133,874  7/1992  Spitzer .................................. 423/130

Primary Examiner—Peter D. Rosenberg
Attorney, Agent, or Firm—Robert A. Miller; Joseph B. Barrett; James J. Drake

[57] ABSTRACT

Bayer process liquors derived from the digestion of bauxites with a caustic solution are purified by removing the organic impurities present in the liquors. Removal of these impurities is accomplished by treating the liquor containing dispersed solids with a high viscosity polymer which includes diallyl dimethyl ammonium monomers.

8 Claims, 1 Drawing Sheet

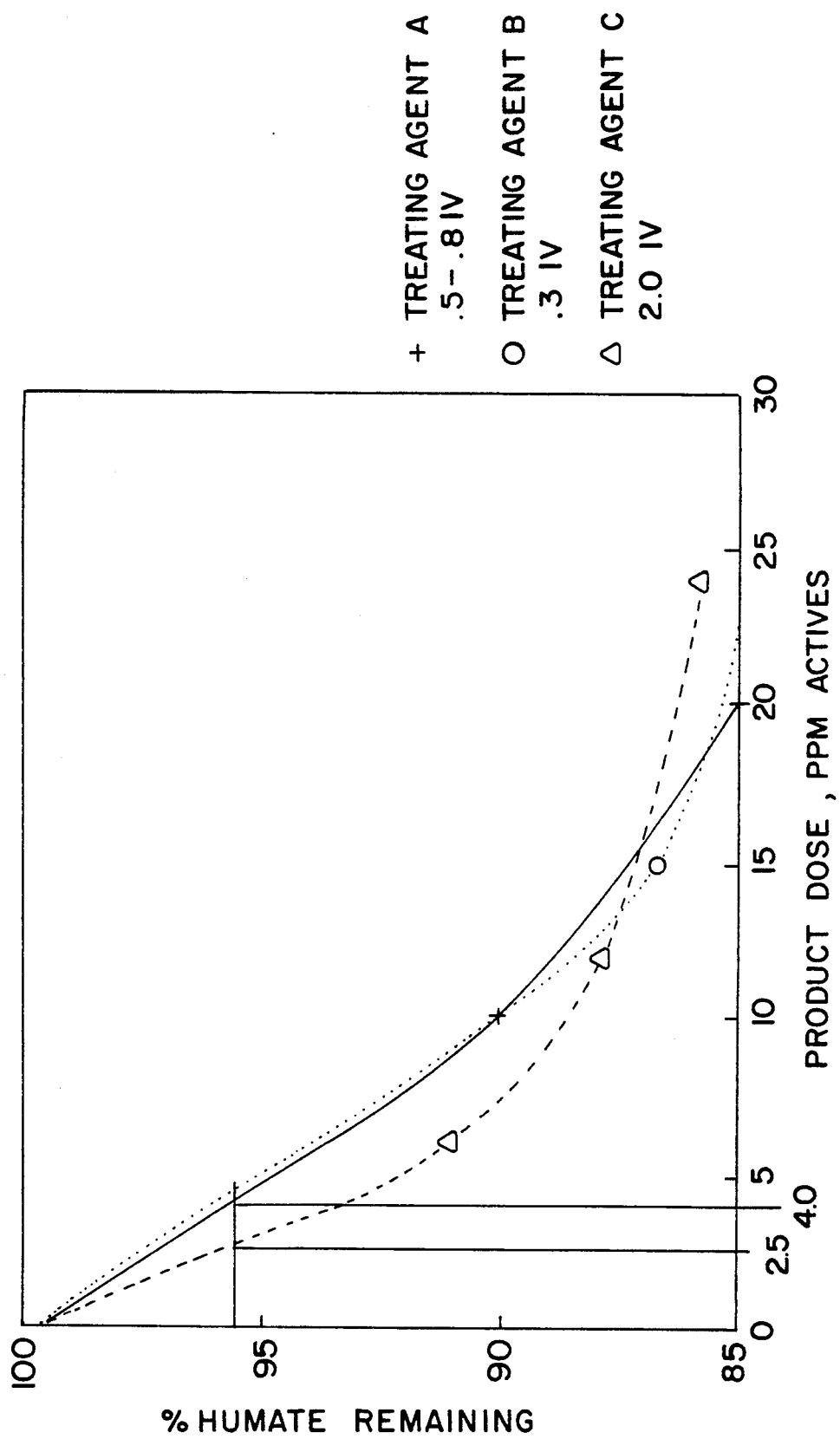

PURIFICATION OF BAYER PROCESS LIQUORS USING CATIONIC POLYMERIC QUATERNARY AMMONIUM SALTS

BACKGROUND OF THE INVENTION

Alumina trihydrate, the precursor of many alumina-based products, including calcined alumina used for making metallic aluminum by reduction, is obtained from alumina-containing ores, such as bauxite. Recovery of the alumina content of bauxite is accomplished by the Bayer process. The Bayer process involves the digestion of bauxite ore with a caustic, such as sodium hydroxide, at elevated temperatures and pressures. Digestion of the bauxite results in a saturated sodium aluminate liquor, referred to as "pregnant liquor". Alumina trihydrate is recovered by precipitation, through the addition of seed alumina.

Bauxite is found in many parts of the world and the composition of the ores may vary from place to place. Bauxite ore contains organic impurities. These organic impurities will be co-extracted with the alumina trihydrate during digestion and will contaminate the pregnant liquor.

Most of the organic impurities found in the ores consist of high molecular weight compounds, such as humic acids. These organic impurities decompose to lower molecular weight compounds during the caustic digestion process and produce a whole spectrum of organic salts dissolved in the pregnant liquor. The organic impurities dissolved in the liquor include color-causing compounds, such as humates, and, consequently, the pregnant liquor will usually possess a dark red color. Since the Bayer process involves extensive recycling of the used caustic liquor, the organic impurity content of the liquor will continuously increase. The accumulation of organic impurities can reach high levels and seriously interfere with the production of alumina trihydrate.

Since the control of organic impurity levels in Bayer process liquors is an important facet in the production of alumina trihydrate, several methods have already been developed for such organic impurity level control. It has been suggested in U.S. Pat. No. 4,046,855 (Schepers et al) that organic impurities can be removed from Bayer process liquors by contacting the liquor with a magnesium compound which will form a precipitated mixture of magnesium and aluminum hydroxides.

In U.S. Pat. No. 4,101,629 (Mercier et al), a barium-containing compound is added to Bayer process liquors. The barium compound precipitates as barium aluminate and the precipitated material may also include barium salts of organic impurities present in the liquor.

In U.S. Pat. No. 4,215,094 (Inao et al), a copper-catalyzed wet oxidation process is recommended for the oxidation or organic impurities, followed by addition of a sulfur-containing compound to remove the copper catalyst as a precipitate. In U.S. Pat. No. 4,275,042 (Lever), sodium oxalate, one of the organic impurities in Bayer liquor, is removed from spent Bayer liquor. In the '042 patent, dissolved sodium oxalate is removed from spent Bayer liquor by addition of a cationic sequestrant to the spent liquor. The cationic sequestrant, preferably a simple quaternary nitrogen compound possessing medium and longchain alkyl groups and a single cationic charge, produces an insoluble product with humic compounds present in the liquor, thus destabilizing the spent liquor with respect to sodium oxalate. Destablizing allows precipitation of a portion of the oxalate impurity content. Although the method shown in the Lever patent allows removal of a portion of the organic impurity content of the liquor, the insoluble sequestrant-humic acid product will form an oily scum on the surface of the spent liquor and cannot be readily removed from the spent liquor. Elimination of the oily layer form the surface of the liquor cannot be done by conventional filtration. It has to be accomplished either by equipment adapted for this particular purpose or by using a filtration method capable of dealing with semi-colloid surface layers. Consequently, the difficulties associated with the process render it impractical.

In U.S. Pat. No. 4,275,043 (Gnyra), a purification method is described which allows reduction of the oxalate impurity level of spent Bayer process liquor. Removal of oxalate and a limited quantity of humic matter is accomplished by treating the impure spent liquor with an adsorbent, such as activated carbon, activated alumina, or clay.

In U.S. Pat. No. 4,335,082 (Matyasi et al) suggest the removal of organic impurities from impure Bayer liquor by caustifying the liquor with lime, followed by evaporation of the cauticized liquor. A similar purification process is disclosed in U.S. Pat. No. 4,280,987 (Yamada et al). In this process, Bayer liquor is first evaporated, then calcined at high temperature after its alumina and caustic content is adjusted to a predetermined level. This process, known in the Bayer industry as "liquor burning", is an effective means of organic impurity removal.

U.S. Pat. No. 4,578,255 (Roe et al) discloses a process for removing humate-type organic impurities from Bayer process liquors using diallyl dimethyl ammonium chloride polymers having an Intrinsic Viscosity of less than about 1.0 and copolymers having Intrinsic Viscosity of less then about 1.5. Although these low Intrinsic Viscosity polymers are somewhat effective at removing humate-type impurities, the present invention, as detailed below, provides polymers which are much more effective in reducing humate-type impurities. The polymers of the present invention can be dosed at a lower concentration than the polymers of the Roe patent while providing a greater benefit to the Bayer process operator. Accordingly the Bayer process operator obtains a better product at a lower cost than was possible using the methods of the prior art.

SUMMARY OF THE INVENTION

A process is provided for removing organic impurities, such as humates, from Bayer process pregnant liquors. A Bayer process liquor containing dispersed solids and organic impurities is treated with a water-soluble, polydiallyl dimethyl ammonium chloride containing polymers having an Intrinsic Viscosity of from about 1.5 to about 4.0. Not to limit the invention, it is believed the polymers bind to the solids which, in turn, bind to the organic impurities to form a dense precipitate which is easily removed from Bayer Process liquors and slurries by standard separation techniques such as filtration, flocculation, settling and the like. According to one embodiment of the invention, the polymer of the invention is added to the humate contaminated liquors in the presence of the solids normally present in these liquors or added to these liquors to improve filtration characteristics.

BRIEF DESCRIPTION OF THE DRAWINGS

FIG. 1 graphically shows the humate removal efficiency of the polymer of the invention compared to prior art polymers.

DESCRIPTION OF THE PREFERRED EMBODIMENTS

This invention relates to the purification of Bayer process liquors, and more particularly it concerns a process for the removal or the reduction of the organic impurity level of Bayer process liquors. For the purposes of the invention, the terms "Bayer process liquors" or "liquor" relate to any caustic liquor which is generated in the Bayer process or is used to dissolve alumina values from bauxite. Typical examples of Bayer process liquors include pregnant liquor, spent liquor, washer underflow, and slurries containing precipitated alumina hydrate, as well as the liquor containing dispersed red mud particles. All of these liquors have varying caustic contents and contain organic impurities. The terms "organic impurity" or "organic impurities" refer to organic matter, such as humic acid, present in Bayer process liquors, the type and quantity of which varies considerably with bauxite source and Bayer plant operating conditions. The greater part of the organic impurities is present as the alkali salts of organic acids which are colorless and, apart from the oxalate content, present only a minor problem from the viewpoint of the quality of the alumina trihydrate produced from the liquor.

Process conditions and alumina hydrate quality are significantly affected by portions of highly colored organic materials most often called "humates", although they may include lignin derivatives. For purposes of this invention, all of these colored materials present in Bayer process liquors are referred to hereinafter as "humates". Humates in Bayer process liquors reduce the quality of the produced alumina trihydrate.

The present invention is directed to reducing the humate content of Bayer process liquors. This goal is achieved by treating Bayer process liquors containing humates in the presence of dispersed solids with a water-soluble, cationic polymer containing the monomer diallyl dimethyl ammonium chloride. The polymers of the invention have an Intrinsic Viscosity of from about 1.5 to about 4.0. The dispersed solids are the types generated by the Bayer process, for example, red mud particles, alumina trihydrate or hydrate, and oxalate salts. The dispersed solids also include various filter aids which are generally incorporated in the liquor prior to filtration. Such filter aids may include certain calcium compounds, for example, calcite, aragonite, or hydrated calcium aluminate which enhance the filtration step. The dispersed solids may also include pretreated filter aids or pretreated seed crystals which are added to the Bayer process prior to reaction with the water-soluble cationic polymers of this invention, thereby forming a solid-polymer composition. The solid-polymer composition may then be added to Bayer process liquors to remove humates and color bodies. For example, filter aids may be precoated with the polymers of the invention prior to being used to precoat filters which are used to remove colloidal matter.

The water-soluble, cationic, polymers employed in the present invention contain dially dimethyl ammonium chloride (POLYDADMAC) monomers. The monomer diallyl dimethyl ammonium chloride (DADMAC) has the following chemical structure:

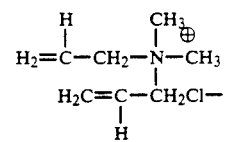

Polymerization of this monomer may be accomplished by standard vinyl polymerization techniques, but is preferably completed by free radical initiation of this vinylic monomer, in the presence or absence of other vinylic monomers such as acrylamide, methylacrylate, and the like. Polymers of this type are described in Butler, U.S. Pat. No. 3,288,770, which is incorporated herein by reference.

Polymerization may be accomplished with the DADMAC monomer alone, leading to homopolymers, or with DADMAC and other vinylic monomers, leading to DADMAC containing copolymers.

The preferred POLYDADMACS to be used in this invention are homopolymers of DADMAC which have an Intrinsic Viscosity of at least 1.5 and preferably have an Intrinsic Viscosity ranging between about 2.0 to about 4.0. As stated previously, POLYDADMAC may also refer to other vinylic polymers containing the DADMAC monomer, such as copolymers of DADMAC and acrylamide. When copolymers are used, the Intrinsic Viscosities are at least 2.0 and may range as high as 4.0.

The term "Intrinsic Viscosity" as used herein refers to the viscosity-molecular weight relationship as described in detail in chapter IV of "Polymer Handbook". Edited by J. Brandrup and E. H. Immergent, Published by Interscience Publishers, New York, 1966.

Incorporation of the polymers of the invention in Bayer process liquors can be suitably accomplished in those Bayer process stages include the settler(s) in which the residue from the digestion of bauxite, red mud, is separated from the "pregnant" liquor containing the desired sodium aluminate; and the washers in which the red mud discharged from the settler(s) is washed to recover alumina and soda values. The flocculation of the mud in the settler(s) and washers is achieved with the aid of either naturally occurring settling aids, such as starch, or any of the commercial synthetic flocculants suitable for red mud. According to one embodiment of this invention, the removal of humates is accomplished by addition of the polymers of the invention directly to the red mud slurry prior to treatment with flocculants and charging to the settler(s).

Generally, the concentration range of the polymers of the invention added per liter of slurry treated is from about 1.0 mg to 500 mg, and, preferably, from about 2.0 mg to 50 mg, depending upon the solids concentration of the slurry. Generally, the polymers of the invention are added neat, or as an aqueous solution containing from 1 to about 50 weight % active polymer. Preferably, the polymers of the invention are added to the mud slurry as an aqueous solution. However, spent liquor may also be used as a dispersing medium. The contact of the humate with the polymer coated mud results in a reduction of the humate content of the liquor which can be readily observed by a change in the color of the treated liquor. Quantitative determination of humate removal can be achieved by well-known colorimetric methods using a conventional colorimeter.

It was discovered that when the high viscosity polymers of the invention are applied to the mud slurry, reduction in humate content of the liquor is readily observed by a change in the color of the treated liquor. Moreover, as shown in the following Examples, it was discovered that the high viscosity polymers of the invention surprisingly and unexpectedly out performed the low viscosity polymers of the prior art. The humates removed from the liquor are adhered or bound to the mud and are discarded together with the mud discharge, thus providing a convenient way of disposal.

Alternatively, according to one embodiment of the invention, the polymers of the invention are added to any of the red mud slurry streams which feed into the mud washers. The introduction of the polymers prior to the settler(s) or washers, instead of directly into the said vessels, ensures the effective dispersion of the treating agent onto the mud particles, and eliminates any possibility of interference with the flocculant used to settle the mud.

In another embodiment of the invention, humate is removed from press feed liquor. The pregnant liquor charged to the press feed tank still contains suspended solids which have to be removed prior to subjecting the pregnant liquor to seeded precipitation. Removal of the suspended solids is generally accomplished by filtration in the presence of filter aids, such as certain calcium compounds. Conventionally, Kelly-type filters are employed and the filters can be coated with a calcium-containing filter aid which allows efficient filtration of the pregnant liquor-containing suspended solids. It was found that effective moval of humates can be accomplished by introducing the high viscosity polymers into the filter aid slurry prior to the subsequent mixing of the filter aid with the press feed liquor. Coating of the surface of the filter aid accomplished two purposes. On the one hand, uniform distribution of the treating agent on the surface can be assured; on the other hand, good contact with the humate-contaminated liquor can be achieved. Alternatively, the treating agent can be introduced into the press feed liquor after the dispersion of the high viscosity polymers is assured. It is to be understood that any other type of filter can be equally utilized in the treatment, and in lieu of the calcium-containing filter aids, other types filter aids, such as cellulosic materials, can also be employed.

It was found that the quantity of polymers of the invention to be applied to the filter aid surface for achieving humate removal is relatively small. Generally, the concentration range of the polymers per liter of liquor treated is within the range from about 1.0 mg to about 400 mg; and, preferably within the range from about 2.0 mg/l to about 50 mg/l. Preferably, the required quantity is applied to the surface of the filter aid from an aqueous solution; however, spent liquor may also be used as a dispersing medium.

In another embodiment of the invention, the removal of humates from Bayer process liquor is accomplished during the hydrate filtration stage of the Bayer process. The removal of the humates in this filtration stage would prevent or, at least, reduce accumulation of humates through recycle of the filtrate. It has been discovered that humates can be successfully removed from the alumina hydrate slurry by introducing the polymers of the invention into the slurry to be filtered.

The following examples are presented to describe preferred embodiments and utilities of the invention and are not meant to limit the invention unless otherwise stated in the claims appended hereto.

EXAMPLE 1

Humate removal was accomplished in an actual Bayer process liquor containing precipitated alumina hydrate solids. A sample of a red mud slurry was obtained and maintained in a 210° F. waterbath. The sample container was tightly sealed to prevent evaporation or condensation. The red mud slurry was continually agitated while in the hot water bath. Three water-soluble cationic polydiallyl polymethyl ammonium chloride homopolymers were used as the treating agents in this example. Treating agent A had an Intrinsic Viscosity of from 0.5 to about 0.8 IV; treating agent B had an Intrinsic Viscosity of 0.3 IV; and treating agent C (one polymer of the present invention) had an Intrinsic Viscosity of 0.2 IV.

The treating agent evaluated in this example were added as 1% aqueous solutions in dionized water. After the treating agents were added to the mud slurry and stirred for approximately two minutes, 2 ml of a 0.1% polyacrylate flocculant was added. The mud was allowed to settle for two minutes. Eleven ml of supernate liquid was withdrawn and filtered through a clean, dry millipore filter assembly filled with 0.4 micron type HB filter membrane. Mild vacuum (less than 12 psi) was used and the vacuum was released immediately after completion. This was done to minimize evaporation of the filtrate. The filtrate was transferred to a 1 cm cell with no dilution and the absorbance at 575 nm was recorded.

FIG. 1 clearly shows that humate removal was far superior for the high viscosity polymers of the present invention when compared to the low viscosity polymers of the prior art. In fact, on a parts per million actives basis, the high viscosity polymers of the invention significantly out perform the low viscosity polymers of the prior art up to a dose of about 14 ppm actives.

It will be understood by those skilled in the art that the various embodiments described herein have many equivalents and that the only limitations on the present invention are those set forth in the appended claims.

We claim:

1. A method for removing humate organic impurities from a Bayer process liquor and Bayer process slurries containing dispersed solids, said solids generated either by the Bayer process or added thereto, the method comprises the steps of adding to the liquor a water-soluble, vinylic cationic polymer including diallyl dimethyl ammonium salt monomer having and Intrinsic Viscosity of from 1.5 to 4.0 in an amount of from 1 to about 500 parts per million, whereby, the polymer, the solids, and humate-type organic impurities precipitate from the liquor, and removing the precipitate from the liquor.

2. A method according to claim 1, wherein the water-soluble cationic polymer containing diallyl dimethyl ammonium chloride monomer has an Intrinsic Viscosity of at least 2.0.

3. A method according to claim 2, wherein the polymer is a homopolymer of diallyl dimethyl ammonium chloride having an Intrinsic Viscosity of at least 2.0.

4. A method according to claim 1, wherein the dispersed solid is alumina hydrate.

5. A method according to claim 1, wherein the liquor is a red mud slurry, the dispersed solids are red mud particles and the polymer is added to the red mud slurry prior to the separation of the red mud particles from the liquor.

6. A method according to claim 1, wherein the liquor is press feed liquor and the dispersed solids are filter aid particles.

7. A method according to claim 1, wherein the filter aid particles are first treated with the polymer and then the treated filter aid is added to the press feed liquor.

8. A method according to claim 1, wherein the dispersed solids are oxalate salts.

* * * * *